United States Patent Office 3,282,971
Patented Nov. 1, 1966

3,282,971
FATTY ACID ESTERS OF POLYHYDRIC ALCOHOLS
Stephen J. Metro, Scotch Plains, Elaine M. Hoffman, New Brunswick, and Alfred H. Matuszak, Westfield, N.J., assignors to Esso Research and Engineering Company, a corporation of Delaware
No Drawing. Filed June 19, 1963, Ser. No. 288,890
6 Claims. (Cl. 260—410.6)

This invention relates to synthetic esters having low volatility and good stability at elevated temperatures. Particularly, the invention relates to a trihydroxy alcohol fully esterified with a no alpha hydrogen monocarboxylic acid and a fatty acid, preferably straight chain.

The use of various diesters, polyesters and complex esters as lubricating oils is well known to the art and has been described in various patents, e.g. U.S. 2,723,286, 2,743,234 and 2,575,196. Because of their utility over extremely wide temperature ranges, the synthetic ester lubricating oils are widely used in the formulation of lubricants for aircraft engines such as turbo-jet, turbo-prop, and turbo-fan engines. Recently, because of the more severe operating conditions associated with newer types of these engines wherein the lubricant is subjected to very high temperatures, ester oil compositions having improved thermal stability have become desirable. One class of esters considered for this high temperature use are those prepared from trimethylolalkanes which have no hydrogens on the carbon atom beta to the hydroxy groups, esterified with no alpha hydrogen carboxylic acid, i.e. carboxylic acid in which there are no hydrogen atoms on the carbon atom adjacent to the carbon atom of the carboxy group. While this class of esters has been found to be extremely stable to high temperature, hydrolysis, and oxidation, the commercially available no alpha hydrogen carboxylic acids are very limited in number, they are high priced, and are in limited supply.

It has now been found that fully esterified esters derived from trimethylolalkanes, e.g. trimethylolpropane, can be prepared which have only a portion of the ester made from the no alpha hydrogen carboxylic acid, and yet which have exceptional stability. Examples of such fully esterified esters of trimethylolpropane are those having either one or two of the ester linkages formed from no alpha hydrogen carboxylic acids, while the remaining ester linkages are formed with a conventional, inexpensive, readily available fatty acid. The resulting esters are less expensive and are nearly as thermally stable as the corresponding ester wherein all the ester linkages are obtained by using no alpha hydrogen carboxylic acids. Exactly why this occurs, is not known with certainty. However, it is believed that the no alpha hydrogen acid moiety will result in sufficient steric hinderance so as to reduce greatly the oxidation attack on those proximate ester linkages which are prepared from the fatty acid. Thus, it is believed that the alkyl groups on the no alpha hydrogen acid not only hinder oxidation attack on the immediate ester group, but in addition shield the ester groups of the adjoining chains. In view of the symmetrical nature of the trimethylol type of alcohols, each of the ester groups are spaced the same distance from the center carbon atom. Because each of the three ester groups are quite close to the center of the tetrahedron defined by the structure of the trimethylolalkane, it is believed that any ester linkage which is directly sterically hindered by the no alpha hydrogen carboxylic acid, will in itself tend to protect the other two adjacent ester linkages by steric hinderance. The preceding is put forth as a possible explanation of the unexpected fact that esters of the invention prepared from both straight chain and the no alpha hydrogen carboxylic acids, were almost as stable as esters prepared from all no alpha hydrogen carboxylic acid.

The no beta hydrogen alcohols used in the present invention will include trimethylolalkanes, and pentaerythritol which is structurally quite similar to the trimethylolalkanes. These alcohols can be represented by the formula:

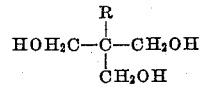

where R is a $C_1$ to $C_6$, preferably a $C_2$ to $C_4$ alkyl group, or a —$CH_2OH$ group. Examples of such alcohols include trimethylolethane, trimethylolpropane, trimethylolbutane and pentaerythritol.

The no alpha hydrogen acid reacted with the no beta hydrogen alcohol can be represented by the general formula:

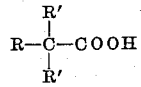

where R is an aliphatic saturated hydrocarbon group of 3 to 12 carbon atoms and R' is preferably a $C_1$ to $C_2$ alkyl group, such as methyl or ethyl. Examples of such acids are α,α-dimethyl valeric; α-ethyl, α-methyl caproic; α,α-dimethyl capric; α,α-dimethyl octanoic, etc.

The no alpha hydrogen acid is used in conjunction with $C_4$ to $C_{14}$, preferably $C_6$ to $C_{12}$, fatty acid. Specific examples of such fatty acids include butyric, valeric, caprylic, 2-ethylhexanoic, pelargonic, lauric, etc.

The esters of the invention are prepared by conventional esterification reactions between the alcohol and acid, preferably using stoichiometric amounts of each to give a fully esterified ester. If desired, a slight excess of reactant, e.g. 10 molar percent excess of the acid, can be used in order to help force the esterification reaction to completion.

Preferably, a molar proportion of the alcohol is first esterified with about 1 to 2 molar proportions, preferably 1 molar proportion, of the no alpha hydrogen acid. After this first stage of esterification, the esterification is then completed with the fatty acid. On the other hand, if the reaction is first carried out with the fatty acid to form a partial ester, and it is then attempted to complete the esterification using the no alpha hydrogen acid, it is very difficult to achieve complete esterification because of the steric hinderance generated by the neo alkyl groups of the acid.

The esterifications are carried out by heating under reflux conditions until the stoichiometric amount of water is removed. Generally, a water entraining agent such as heptane or toluene is used. Acidic, basic or neutral esterification catalysts can be used. Usually acidic catalysts are used, for example, sodium acid sulfate, sulfuric acid p-toluene sulfonic acid, etc. Or the esterification can be carried out with no catalyst. When the esterification reaction is complete, the reaction mixture can be vacuum stripped to remove any entraining agent remaining as well as other volatile materials. If an acidic catalyst has been used, it may be desirable to filter the reaction mixture and/or to neutralize it with a dilute alkaline solution, such as sodium carbonate, followed by water washing. After this, the ester may be vacuum stripped in order to remove any water contamination, unreacted alcohol, etc. and preferably is then distilled to give a high purity product.

The resulting hindered esters of the invention can be used per se as the base oil for a lubricant, or they can be blended in any proportions with other high temperature synthetic oils such as polysilicones, polyphenyl ether, no beta hydrogen diesters, complex esters, etc. Or, they can be added to more conventional lubricating oil esters, such as di-2-ethylhexyl sebacate, in order to upgrade said conventional esters. In addition, the esters can be used as plasticizers, as chemical intermediates, etc.

Various other additives can also be added to the lubricating compositions of the invention in amounts of about 0.001 to 10.0 weight percent each, based on the total weight of the composition. Examples of such additives include: rust preventives such as calcium petroleum sulfonate or sorbitan monooleate; V.I. improvers such as the polymethacrylates; oxidation inhibitors such as diphenyl-p-phenylenediamine, cyclohexyl-p-phenylenediamine, phenyl-alpha-naphthylamine, para-aminodiphenylamine, 3,7-dioctyl phenothiazine, p,p'-dioctyl diphenylamine and phenothiazine; load carrying agents such as tricresyl phosphate and free sevacic acid; pour point depressants; dyes; grease thickeners; and the like.

The invention will be further understood by reference to the following examples:

*Example I.—Trimethylolpropane mono-neooctanoate, dipelargonate*

A flask equipped with thermometer, stirrer, charging inlet and a condenser equipped with a water trap was charged as follows:

134 grams (1 mole) of trimethylolpropane (TMP) was added to a flask with 150 grams (1 mole) of neo-octanoic acid, along with 1.5 grams of NaHSO₄ as an esterification catalyst and 25 ml. of heptane as a water-entraining agent. The reaction mixture was then refluxed at atmospheric pressure until 1 mole of water had been removed. Then, 348 grams (2.2 moles of which 0.2 mole is excess) pelargonic acid and 3 grams of additional NaHSO₄ catalyst was added. The reaction mixture was then heated to reflux and an additional 2 moles of water was removed by the esterification reaction. The reaction product was then cooled and filtered through filter paper to remove the catalyst. The product was then washed with 10% of an aqueous sodium carbonate, i.e. 10 wt. percent sodium carbonate in 90 wt. percent water, in which resulted in the formation of an emulsion. About 15 cc. of isopropyl alcohol was added to break the emulsion and permit the decantering of the sodium carbonate solution. The product was then water-washed. Next, the product was again washed with the 10% sodium carbonate solution but this time no emulsion formed. The product was then water washed, and again washed with sodium carbonate followed by water-washing. The now thoroughly neutralized and washed product was then distilled at atmospheric pressure to a temperature of 105° C. in order to remove any water, or solvent that might be present. Following this, the product was then distilled under 1 mm. mercury pressure to a temperature ranging to about 225° to 228° C. The distillate constituted the product of the invention.

The neooctanoic acid used above was alpha, alpha-dimethylcaproic acid having the structure:

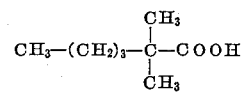

*Example II.—Trimethylolpropane mono-neoheptanoate, dipelargonate*

Trimethylolpropane mono-neoheptanoate, dipelargonate was prepared in a manner similar to that of Example I by using neoheptanoic acid in place of the neooctanoic acid.

The neoheptanoic acid was alpha, alpha-dimethylvaleric acid having the structure:

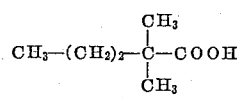

The products of Examples I and II, trimethylolpropane tripelargonate, and trimethylolpropane tri-alpha, alpha-dimethylvalerate are compared in Table I which follows:

TABLE I

|  | Example I— TMP Mono Neo C₈, Dipelargonate | Example II— TMP Mono Neo C₇, Dipelargonate | TMP Tri-Pelargonate | TMP Tri Neo C₇ |
|---|---|---|---|---|
| Visc., cs.: |  |  |  |  |
| At 100° F | 34.05 | 24.02 | 23.9 | 35.04 |
| At 210° F | 5.90 | 4.57 | 4.91 | 4.76 |
| At −40° F | 16,450 | 9,775 | 5,211 | 175,000 |
| Pour, °F | −55 | −75 | −65 | −40 |
| Flash, °F |  | 475 | 485 | 475 |
| Auto. Ign. Temp., °C |  | 780 |  | 795 |
| 450° F. Evap. Loss: |  |  |  |  |
| Percent at Atmos. pressure | 24.6 | 34 | 10.8 | 97 |
| Percent at 40,000 ft. Altitude | 36.3 | 52 | 31.2 | 100 |
| 425° F. Oxid. Test—25 Hrs.—100 v./v./hr.: |  |  |  |  |
| 1% diphenyl-p-phenylenediamine— |  |  |  |  |
| Visc. Inc., percent |  | 4.0 | 53.6 |  |
| TAN Inc |  | 0.81 | 4.32 |  |
| 1% cyclohexyl p-phenylenediamine— |  |  |  |  |
| Visc. Inc., percent |  | 2.6 | 46.3 | −1.4 |
| TAN Inc |  | 0.43 | 3.35 | 0.10 |

The 425° F. Oxidation Test was carried out by blowing air at the rate of 100 volumes per hour through one volume of the ester maintained at a temperature of 425° F. for 25 hours. The percent increase in centistoke viscosity and the increase in total acid number (T.A.N.), was determined. These oxidation tests were carried out after adding 1 wt. percent of amine oxidation inhibitor to the esters under test, since amine inhibitors are normally used with ester lubricating oils.

As seen by the data of Table I, the ester prepared only from fatty acid, i.e. the TMP Tripelargonate showed very large increases in viscosity and total acid number, even when inhibited with conventional amine inhibitors. In comparison, the completely hindered ester, i.e. the TMP-Neo C₇ ester showed very little viscosity or acid number increase. However, this ester is quite expensive. Now the corresponding ester of the invention, i.e. Example II using only a third of the neo C₇ acid, gave results nearly as good as the all neo C₇ ester. This was surprising, as a normal expectation would be that the mono neo C₇ ester would give oxidation results about a third of the way between the completely hindered ester and the completely unhindered ester.

What is claimed is:

1. A fully esterified ester of a polyhydric alcohol represented by the general formula:

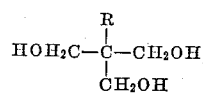

wherein R is a member selected from the group consisting of $C_1$ to $C_6$ alkyl groups and $CH_2OH$ groups, which polyhydric material is esterified with 1 to 2 molecular proportions of a non alpha hydrogen carboxylic acid of the general formula:

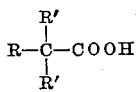

wherein R is an aliphatic saturated hydrocarbon group of 3 to 12 carbon atoms and R' is a $C_1$ to $C_2$ alkyl group, said polyhydric material being further esterified with a $C_4$ to $C_{14}$ fatty acid.

2. An ester according to claim 1, wherein said polyhydric material is a trimethylolalkane.

3. An ester according to claim 2, wherein said trimethylolalkane is trimethylolpropane.

4. An ester according to claim 1, wherein said non alpha hydrogen acid contains 7 carbon atoms.

5. Trimethylolpropane mono-(alpha, alpha - dimethylvalerate), dipelargonate.

6. Trimethylolpropane mono-(alpha, alpha - dimethylcaproate), dipelargonate.

No references cited.

CHARLES B. PARKER, *Primary Examiner.*

ANTON H. SUTTO, *Assistant Examiner.*